(12) United States Patent
Baksh et al.

(10) Patent No.: US 7,179,324 B2
(45) Date of Patent: Feb. 20, 2007

(54) CONTINUOUS FEED THREE-BED PRESSURE SWING ADSORPTION SYSTEM

(75) Inventors: Mohamed Safdar Allie Baksh, Wheatfield, NY (US); Andrew C. Rosinski, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/848,377

(22) Filed: May 19, 2004

(65) Prior Publication Data

US 2005/0257685 A1 Nov. 24, 2005

(51) Int. Cl.
*B01D 53/02* (2006.01)
(52) U.S. Cl. .................. 95/100; 95/103; 95/104; 95/122
(58) Field of Classification Search .......... 95/96–98, 95/100–105, 117–119, 122, 130, 139, 143
See application file for complete search history.

(56) References Cited

U.S. PATENT DOCUMENTS

| | | | | |
|---|---|---|---|---|
| 3,430,418 A | | 3/1969 | Wagner | 55/25 |
| 3,564,816 A | | 2/1971 | Batta | 55/26 |
| 3,636,679 A | * | 1/1972 | Batta | 95/100 |
| 3,703,068 A | * | 11/1972 | Wagner | 95/11 |
| 3,717,974 A | * | 2/1973 | Batta | 95/98 |
| 3,751,878 A | * | 8/1973 | Collins | 95/105 |
| 3,797,201 A | * | 3/1974 | Tamura | 95/105 |
| 4,468,237 A | * | 8/1984 | Fuderer | 95/100 |
| 4,650,501 A | * | 3/1987 | Hiscock et al. | 95/100 |
| 4,775,394 A | * | 10/1988 | Yamano et al. | 95/101 |
| 4,781,735 A | * | 11/1988 | Tagawa et al. | 95/101 |
| 4,813,977 A | * | 3/1989 | Schmidt et al. | 95/102 |
| 4,859,217 A | * | 8/1989 | Chao | 95/130 |
| 5,015,272 A | * | 5/1991 | Okada et al. | 95/26 |
| 5,084,075 A | | 1/1992 | Sircar | 55/25 |
| 5,174,979 A | * | 12/1992 | Chao et al. | 95/96 |
| 5,294,247 A | | 3/1994 | Scharf et al. | 95/101 |
| 5,328,503 A | * | 7/1994 | Kumar et al. | 95/101 |
| 5,413,625 A | * | 5/1995 | Chao et al. | 95/103 |
| 5,454,857 A | * | 10/1995 | Chao | 95/96 |
| 5,512,082 A | * | 4/1996 | Zarchy et al. | 95/101 |
| 5,529,611 A | * | 6/1996 | Monereau et al. | 95/101 |
| 5,656,065 A | * | 8/1997 | Kalbassi et al. | 95/96 |
| 5,656,067 A | * | 8/1997 | Watson et al. | 95/101 |
| 5,674,311 A | * | 10/1997 | Notaro et al. | 95/96 |
| 5,698,013 A | * | 12/1997 | Chao | 96/108 |
| 5,704,964 A | * | 1/1998 | Kaneko et al. | 95/23 |
| 5,753,010 A | | 5/1998 | Sircar et al. | 95/45 |
| 5,792,239 A | * | 8/1998 | Reinhold et al. | 95/101 |
| 5,863,315 A | * | 1/1999 | Jullian et al. | 95/98 |
| 5,906,673 A | * | 5/1999 | Reinhold et al. | 95/45 |
| 5,906,675 A | * | 5/1999 | Jain et al. | 95/99 |
| 5,912,422 A | | 6/1999 | Bomard et al. | 95/96 |
| 5,985,003 A | * | 11/1999 | Hayashi et al. | 95/101 |
| 6,027,549 A | | 2/2000 | Golden et al. | 95/98 |
| 6,099,618 A | * | 8/2000 | Monereau | 95/101 |
| 6,210,466 B1 | | 4/2001 | Whysall et al. | 95/100 |
| 6,315,818 B1 | * | 11/2001 | Monereau | 95/98 |

(Continued)

*Primary Examiner*—Robert Hopkins
(74) *Attorney, Agent, or Firm*—Flora W. Feng

(57) ABSTRACT

A three-bed pressure swing adsorption system providing a constant continuous supply gas, preferably containing a hydrogen component, in a multi-step and preferably in a twelve-step, process cycle that can produce a purified gas product, preferably hydrogen, on a constant flow.

11 Claims, 6 Drawing Sheets

U.S. PATENT DOCUMENTS

| | | | |
|---|---|---|---|
| 6,340,382 B1 | 1/2002 | Baksh et al. | 95/96 |
| 6,379,431 B1 | 4/2002 | Xu et al. | 95/100 |
| 6,402,813 B2 * | 6/2002 | Monereau et al. | 95/96 |
| 6,428,607 B1 * | 8/2002 | Xu et al. | 95/101 |
| 6,454,838 B1 * | 9/2002 | Xu et al. | 95/98 |
| 6,483,001 B2 * | 11/2002 | Golden et al. | 585/820 |
| 6,503,299 B2 * | 1/2003 | Baksh et al. | 95/98 |
| 6,521,143 B1 * | 2/2003 | Genkin et al. | 252/373 |
| 6,527,830 B1 * | 3/2003 | Neu et al. | 95/98 |
| 6,551,380 B1 * | 4/2003 | Reddy et al. | 95/41 |
| 6,558,451 B2 * | 5/2003 | McCombs et al. | 95/98 |
| 6,585,804 B2 * | 7/2003 | Kleinberg et al. | 95/101 |
| 2002/0014153 A1 * | 2/2002 | Baksh et al. | 95/96 |
| 2003/0097930 A1 | 5/2003 | Kleinberg et al. | 95/96 |
| 2004/0025692 A1 * | 2/2004 | Sumida et al. | 95/96 |

* cited by examiner

CONTINUOUS FEED THREE-BED PRESSURE SWING ADSORPTION SYSTEM

FIELD OF THE INVENTION

This invention relates to a pressure swing adsorption (PSA) system for purifying an impure supply gas stream containing a desirable pure gas, such as hydrogen, using a continuous feed of the supply gas stream.

BACKGROUND OF THE INVENTION

The need for high purity gases, such as hydrogen, is growing in the chemical process industries, e.g., in steel annealing, silicon manufacturing, hydrogenation of fats and oils, glass making, hydrocracking, methanol production, the production of oxo alcohols, and isomerization processes. This growing demand requires the development of highly efficient separation processes for $H_2$ production from various feed mixtures. In order to obtain highly efficient PSA separation processes, both the capital and operating costs of the PSA system must be reduced.

One way of reducing PSA system cost is to decrease the adsorbent inventory and number of beds in the PSA process. In addition, further improvements may be possible using advanced cycles and adsorbents in the PSA process. However, $H_2$ feed gas contains several contaminants, e.g. a feed stream may contain $CO_2$ (20% to 25%) and minor amounts of $H_2O$ (<0.5%), $CH_4$ (<3%), $CO$ (<1%) and $N_2$ (<1%). Such a combination of adsorbates at such widely varying compositions presents a significant challenge to efficient adsorbent selection, adsorbent configuration in the adsorber, and the choices of individual adsorbent layers and multiple adsorbent bed systems to obtain an efficient $H_2$-PSA process.

U.S. Pat. No. 6,551,380 B1 relates to a gas separation apparatus and process that has a first PSA unit for receiving feed gas which comprises a first and a second component. First PSA unit produces first product gas predominantly containing the first component, and the first off gas containing at least some of the first component and second component. A compressor is coupled to a first PSA unit to compress first off gas to form compressed off gas, which is passed downstream to an absorber unit, which employs a solvent to remove at least part of the second component from compressed off gas, forming an enriched compressed off gas. Second PSA unit receives enriched compressed off gas and produces second product gas which predominantly contains the first component and a second off gas that is sent to waste or reformer burner.

U.S. Pat. No. 6,521,143 B1 relates to a process that provides for simultaneously producing a syngas product having a $H_2/CO$ ratio of less than 2.5 and a hydrogen gas product. The process includes increasing an amount of carbon dioxide being fed to a secondary reformer with carbon dioxide extracted from: (a) an effluent from a primary reformer and (b) an effluent from the secondary reformer. An apparatus for performing the process is also provided.

U.S. Pat. No. 6,503,299 B2 relates to a two bed PSA process for recovering a primary gaseous component at a purity of over 99% from a feed gas comprising the primary component and one or more impurities. One such process includes: (a) passing the feed gas through a first adsorption bed to remove one or more impurities; (b) conducting a PSA cycle in the first bed; (c) separately passing effluent gases from the first bed into at least two separate tanks for subsequent purging and pressurization of the beds; (d) storing a gas mixture in the first of the tanks containing the primary component in a concentration higher than the concentration of the primary component in the gas mixture in the second of the tanks; (e) refluxing the mixture of the primary component from the second tank in the first adsorption bed during the regeneration steps therein; (f) refluxing the mixture of the primary component from the first tank in the first adsorption bed during the regeneration steps therein; (g) simultaneously and non-concurrently performing steps (a) to (f) in a second bed; and (h) recovering the product gas stream.

U.S. Pat. No. 6,340,382 B1 relates to a PSA process for purifying a synthesis gas stream containing from 60 to 90 mole % hydrogen and impurities such as $C_{O2}$, $CH_4$, $N_2$, and $CO$. The PSA process of this disclosure further provides a method of adsorbing substantially all of the nitrogen and other contaminants from the feed gas stream; wherein the feed stream is passed at superatmospheric pressure through a plurality of adsorbent beds and each adsorbent bed contains at least a CaX, LiA, LiX or calcium containing mixed cation zeolite having a $SiO_2/Al_2,O_3$ mole ratio of 2.0–2.5. Such process involves sequentially pressurizing, depressurizing, purging and repressurizing the adsorbent beds with product hydrogen, and recovering product hydrogen in purities of 99.9% or greater from the beds.

U.S. Pat. No. 6,402,813 B2 relates to a gas stream containing one or more gaseous impurities from the group formed by carbon dioxide, water vapor, $H_{2S}$, alcohols, $SO_2$ and $C_1$–$C_8$ saturated or unsaturated, linear, branched or cyclic hydrocarbons which is brought into contact with several different porous carbon adsorbents, that is to say active carbons having different properties and characteristics. The gas is air, nitrogen, hydrogen produced by the reforming or cracking of ammonia or the combustion gas or fermentation gas.

U.S. Pat. No. 6,483,001 B2 relates to a PSA apparatus and process for the production of purified hydrogen from a feed gas stream containing heavy hydrocarbons (i.e., hydrocarbons having at least six carbons). The apparatus comprises at least one bed containing at least three layers. The layered adsorption zone contains a feed end with a low surface area adsorbent (20 to 400 $m^2/g$) which comprises 2 to 20% of the total bed length followed by a layer of an intermediate surface area adsorbent (425 to 800 $m^2/g$) which comprises 25 to 40% of the total bed length and a final layer of high surface area adsorbent (825 to 2000 $m^2/g$) which comprises 40 to 78% of the total bed length.

U.S. Pat. No. 6,027,549 relates to a process for adsorbing carbon dioxide from a carbon dioxide containing gas mixture comprising contacting the gas mixture with an activated carbon adsorbent having a density in the range of approximately 0.56 to 0.61 g/cc (35 to 38 lbs./$ft^3$) and adsorbing the carbon dioxide on the activated carbon adsorbent.

U.S. Pat. No. 5,294,247 relates to a process for recovering hydrogen from dilute refinery off gases using a vacuum swing adsorption process having a simultaneous cocurrent depressurization to provide a purge gas for another bed under the influence of a vacuum and countercurrent depressurization to vent void space gas and/or adsorbed gas to ambient.

U.S. Pat. No. 6,454,838 B1 relates to a PSA process includes providing a PSA apparatus having six beds, and equalizing a pressure of each of the six beds in four steps, wherein at all times during the process, at least one of the six beds is providing off gas. The process is particularly suitable for purifying hydrogen from a feed gas mixture containing hydrogen and at least one of the methane, carbon dioxide, carbon monoxide, nitrogen and water vapor.

U.S. Pat. No. 6,379,431 B1 relates to a PSA process including an adsorption apparatus having a plurality of beds and countercurrently purging at least two of the beds simultaneously throughout the process. The number of beds and number of pressure equalization steps are not particularly limited, but a ten-bed, four pressure equalization step process is advantageous. In addition, other ten-bed, four pressure equalization step processes are disclosed which do not countercurrently purge at least two of the beds simultaneously, but which have an average of at least two of the ten beds being simultaneously regenerated by simultaneously providing off gas from a feed end of each of the beds to an off gas line.

U.S. Pat. No. 5,912,422 relates to a process for the separation of the hydrogen contained in a gas mixture contaminated by carbon monoxide and containing at least one other impurity chosen from the group consisting of carbon dioxide and saturated or unsaturated, linear, branched or cyclic $C_1$–$C_8$ hydrocarbons, comprising bringing the gas mixture to be purified into contact, in an adsorption region, with at least:

one first adsorbent selective at least for carbon dioxide and for $C_1$–$C_8$ hydrocarbons and one second adsorbent which is a zeolite of faujasite type exchanged to at least 80% with lithium, the Si/Al ratio of which is less than 1.5, in order to remove at least carbon monoxide (CO).

U.S. Pat. No. 6,210,466 B1 relates to a process which overcomes historical limitations to the capacity of PSA units for a wide variety of gas separations. Capacities in excess of about 110 thousand normal cubic meters per hour (100 million standard cubic feet per day) can now be achieved in a single integrated process train. The corresponding significant equipment reduction results from a departure from the accepted principle in the PSA arts that the length of the purge step must be equal to or less than the length of the adsorption step. By increasing the purge time relative to the adsorption step combined with supplying the purge gas for any adsorption bed in the train from one or more other adsorption beds and during the provide-purge step, the other adsorption beds simultaneously provide the purge gas to essentially all adsorption beds undergoing the purge step, that the single train can provide for significant increases in capacity with a minimum loss in recovery or performance. The benefit of this discovery is that very large-scale PSA units can now be constructed as a single train of equipment for a cost significantly lower than the cost of two or more parallel trains of equipment.

U.S. Pat. No. 5,753,010 relates to a method for increasing product recovery or reducing the size of steam methane reformer and pressure swing adsorption systems utilized for hydrogen production. A significant portion of the hydrogen in the PSA depressurization and purge effluent gas, which is otherwise burned as fuel in the reformer, is recovered and recycled to the PSA system to provide additional high purity hydrogen product. This is accomplished by processing selected portions of the depressurization and purge effluent gas in adsorbent membrane separators to increase hydrogen content for recycle to the PSA system. Remaining portions of the depressurization and purge effluent gas which contain lower concentrations of hydrogen are utilized for fuel value in the reformer.

U.S. Pat. No. 3,430,418 relates to an adiabatic pressure swing adsorption process for selectively adsorbing components such as carbon dioxide, water and light aliphatic hydrocarbons from admixture with hydrogen gas is provided by at least four adsorbent beds joined in a particular flow sequence.

U.S. Pat. No. 3,564,816 relates to a PSA process for separation of gas mixtures in which at least four adsorbent beds are joined so that the adsorbate loaded bed is pressure equalized with two other beds in staged sequence.

U.S. Pat. No. 6,558,451 B2 relates to a compact multiple bed PSA apparatus to produce a high concentration of oxygen efficiently and at minimum noise levels by using inactive pressurized adsorber beds to purge adsorbed nitrogen.

U.S. Pat. No. 6,428,607 B1 relates to a PSA process for the separation of a pressurized feed gas containing at least one more strongly adsorbable component and at least one less strongly adsorbable component. The process comprises (a) introducing the pressurized feed gas into a feed end of an adsorber bed containing one or more solid adsorbents which preferentially adsorb the more strongly adsorbable component and withdrawing from a product end of the adsorber bed a first adsorber effluent gas enriched in the less strongly adsorbable component, wherein the first adsorber effluent gas is utilized as final product gas; (b) terminating the introduction of the pressurized feed gas into the adsorber bed while withdrawing from the product end of the adsorber bed a second adsorber effluent gas enriched in the less strongly adsorbable component, wherein the pressure in the adsorber bed decreases while the second adsorber effluent gas is utilized as additional final product gas; (c) depressurizing the adsorber bed to a minimum bed pressure by withdrawing additional gas therefrom; (d) repressurizing the adsorber bed by introducing repressurization gas into the bed, wherein at least a portion of the repressurization gas is provided by pressurized feed gas; and (e) repeating steps (a) through (d) in a cyclic manner. No final product gas is required for purge or repressurization in the process cycle steps.

U.S. Pat. No. 5,084,075 relates to a method for recovering nitrogen from air in a three bed vacuum swing adsorption technique in which the beds are not rinsed with nitrogen gas before recovering a nitrogen recycle stream and a nitrogen product.

An object of the present invention is to provide a multiple bed PSA system, preferably a three bed PSA system, that can process a continuous impurity gas stream to produce a high purity gas component without the use of storage tanks for collecting void gases during pressure changing steps in the PSA cycle.

Another object of the present invention is to provide a compact three bed PSA system that can operate with continuous supply gas at lower adsorption pressures, lower bed size factor (bsf) and lower capital cost relative to prior art PSA processes.

Another object of the invention is to provide a novel three bed PSA system for the production of hydrogen from a continuous impure gas stream containing hydrogen as a component.

Other objects and advantages of the invention will be apparent from the following description taken in connection with the accompanying drawings.

BRIEF SUMMARY OF THE INVENTION

The invention provides a pressure swing adsorption process for the separation of a pressurized supply feed gas containing at least one more strongly adsorbable component and at least one less strongly adsorbable product gas component in a multiple bed system which comprises the continuous feeding of a supply gas into a feed end of an adsorber bed containing at least one solid adsorbent which preferentially adsorbs the more strongly adsorbable component and withdrawing the least strongly adsorbable product component from an exit end of the adsorber bed, producing in cycles by steps in which the continuous feeding of the supply gas in sequentially co-current direction through each of the adsorber beds to produce gas product using continuous feed gas, pressurization step, pressure equalization step, constant product gas step and purge step in the PSA cycle.

The product gas of the process is preferably hydrogen although the process can also be extended to other separation processes such as helium purification, natural gas upgrading, $CO_2$ production from synthesis gas or other sources containing $CO_2$ in the supply feed or in other PSA processes for coproduction of $H_2$ and CO. One of the novel features of the invention is the use of a continuous feed supply gas in a multiple bed PSA system, preferably a three bed $H_2$ PSA system, that utilizes shorter beds having a lower adsorption pressure with an optimum ratio of product pressurization to adsorption pressure ranges from about 0.20 to about 0.35 for adsorption pressure from 20 psig to 900 psig from a 12-step cycle and 50 psig to 900 psig for other cycle steps. The above optimum amount of product pressurization is required to minimize bed size factor (bsf) in the production of high purity hydrogen at high recoveries. The amount of product pressurization is defined by dividing the change in bed pressure during the product pressurization step by the adsorption pressure.

DETAILED DESCRIPTION OF THE INVENTION

In a first and preferred embodiment of the invention, the novel PSA system employs a twelve-step three adsorbent bed PSA cycle having two pressure equalization steps in addition to purging and product pressurization steps. The PSA process also utilizes a continuous supply gas feed without the use of storage tanks and utilizes a product pressurization step before a high pressure equalization step. The three bed PSA cycle has lower bed size factor than prior art PSA processes.

Another embodiment of the invention utilizes a nine-step three bed PSA system having a high-pressure equalization step overlapped with feed pressurization step without a product pressurization step.

Another embodiment of the invention utilizes a nine-step three bed PSA system having a product pressurization step without a high pressure equalization step.

A primary benefit of the twelve-step three bed hydrogen PSA system in comparison to either embodiments of the nine-step three bed system, is reduction in the bed size factor.

Suitable adsorbents such as activated carbons with different bulk densities and other zeolitic materials such as Li—X zeolite, CaX (2.0), etc. can be used in the three bed PSA separation process without deviating from the scope of the invention. For example, instead of using VSA6 zeolite, the three bed PSA process could also use CaX (2.0) and naturally occurring crystalline zeolite molecular sieves such as chabazite, erionite and faujasite. Furthermore, zeolite containing lithium/alkaline earth metal A and X zeolites (Chao et al., U.S. Pat. Nos. 5,413,625; 5,174,979; 5,698,013; 5,454,857 and 4,859,217) may also be used in this invention.

Also, each of the layered adsorbent zones in each of the PSA beds could be replaced with layers of adsorbents of the same type. For example, the single layer of zeolite in each bed could be replaced with multiple layers of different adsorbents (e.g., VSA 6 could be replaced by a first layer of 13 X with VSA6 on top). In addition, the zeolite layer could be substituted by a composite adsorbent layer containing different adsorbent materials positioned in separate zones in which temperature conditions favor adsorption performance of the particular adsorbent material under applicable processing conditions in each zone. Further details on composite adsorbent layer design is given by Notaro et al., U.S. Pat. No. 5,674,311.

BRIEF DESCRIPTION OF THE DRAWINGS

The invention is described with reference to the appended figures.

FIGS. 1 and 2 show a twelve-step three bed PSA system comprising three adsorber beds, 17 ON/OFF valves, 5 control valves (CV) and associated piping and fittings. The control valves are used to control the flow rate or pressure during certain steps in the process; CV-1 controls the flow rate out of the bed during the first blowdown; CV-2 controls the rate at which the beds provide purge; CV-3 controls the rate at which the beds equalize; CV-4 controls the rate at which the beds receive product pressurization gas; and CV-5 maintains the bed at constant pressure during product production.

Figure 1:
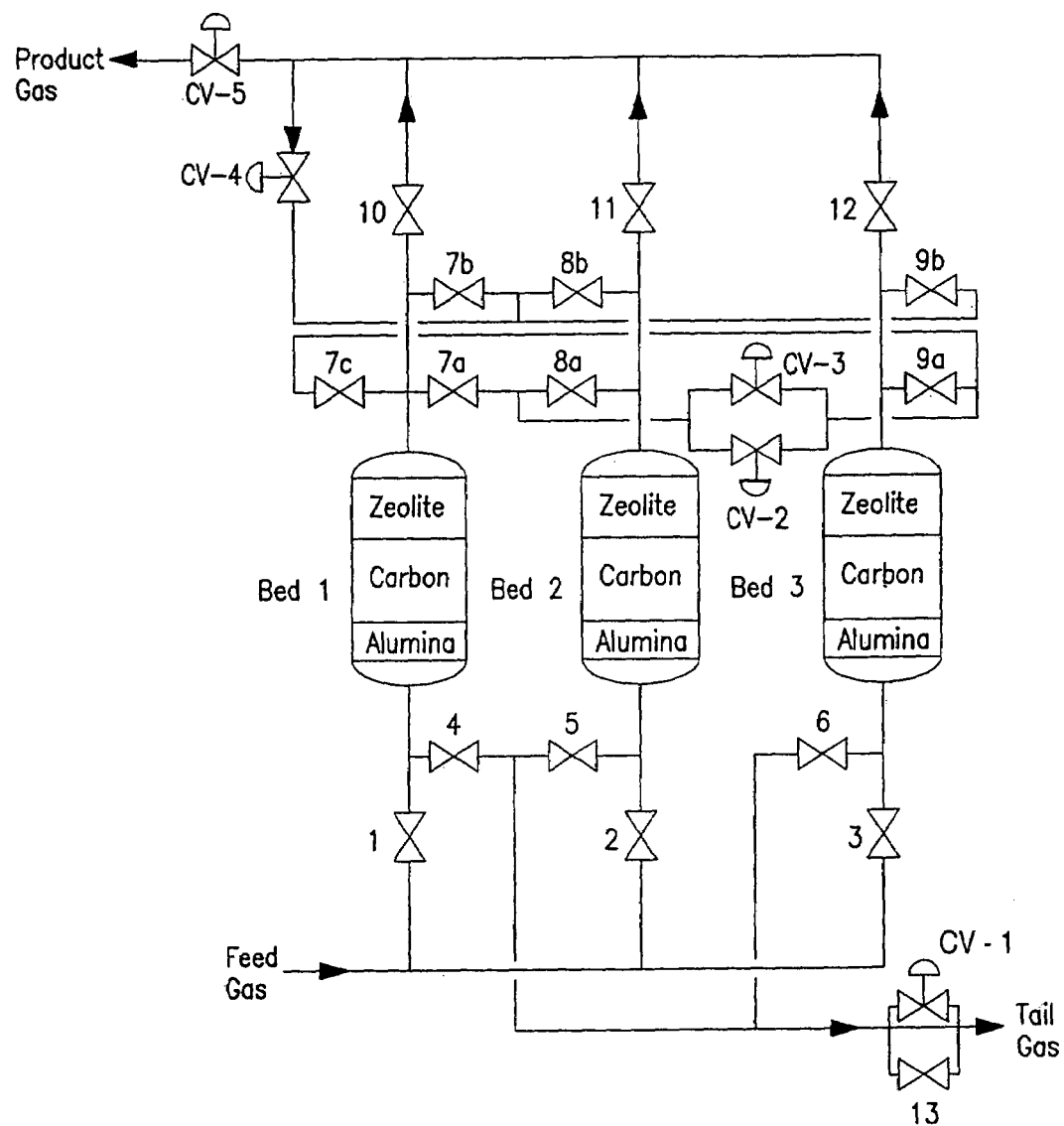
FIG. 1 is a schematic flow diagram for a three bed PSA system in accordance with the invention.
Figure 2:
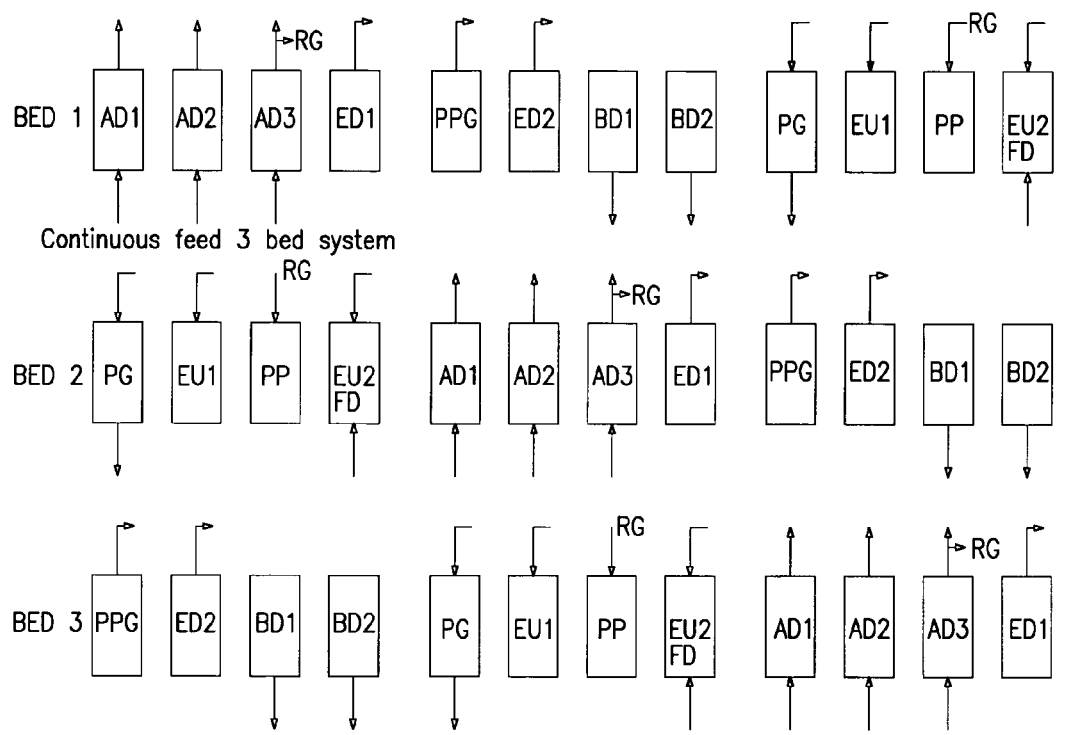
FIG. 2 is a series of schematic illustrations of adsorption beds as they undergo each step of the first embodiment of a twelve-step three bed PSA system of the present invention.
Figure 3:
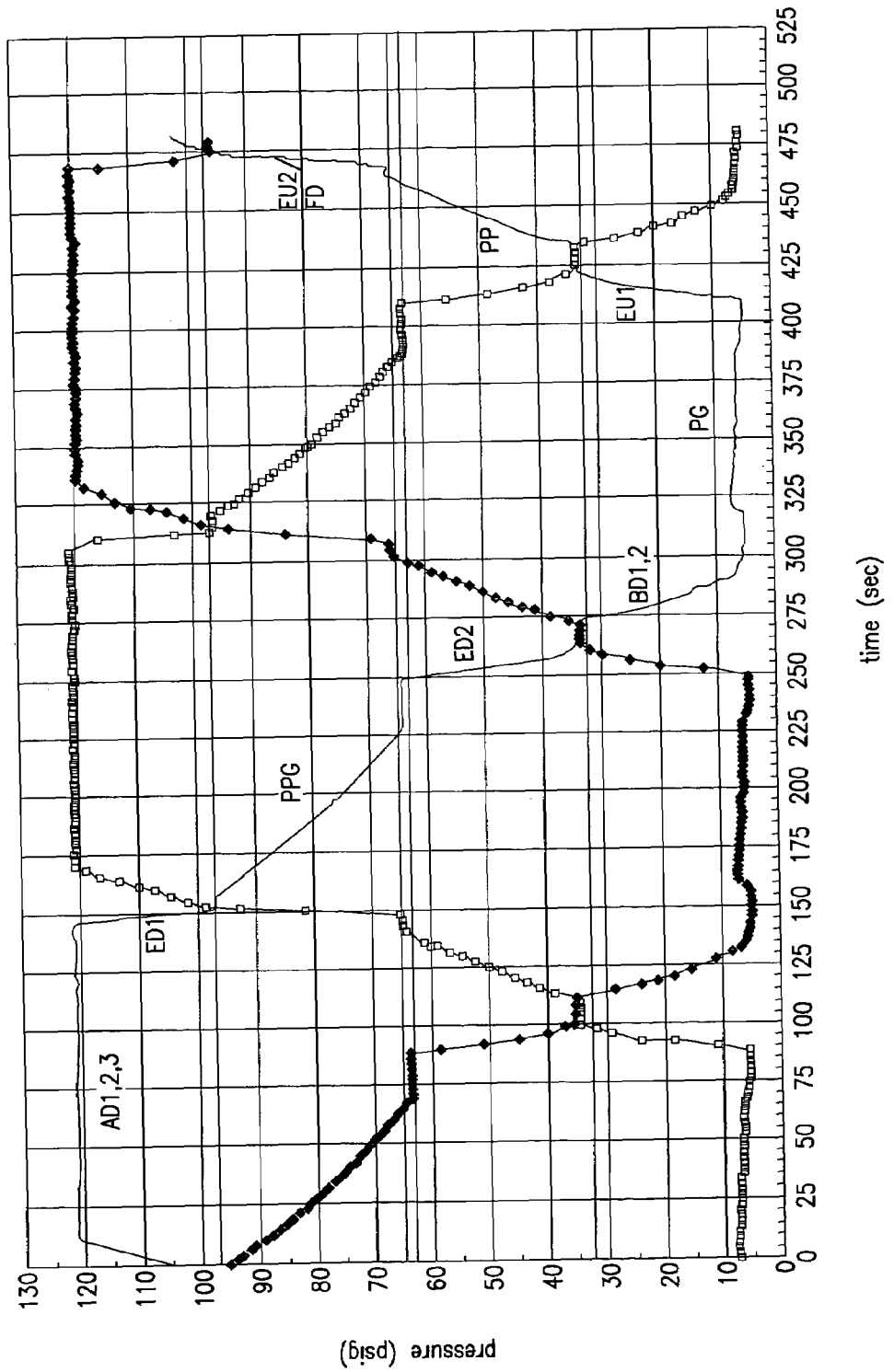
FIG. 3 is process pressure profiles of a twelve-step three bed PSA system.

An example of a PSA process using the three bed PSA process of this invention is shown on FIGS. 1–3, having operation conditions shown in Table 1 and the valve switching logic of Table 2. The results shown below were obtained from a PSA pilot plant using a feed mixture on a dry basis: 77.4% $H_2$, 19.24%, $CO_2$, 0660.66% CO, 1.99% $CH_4$ and 0.70 $N_2$. Also in the table, total bed size factor is the total quantity of adsorbents per ton per day of $H_2$ produced.

TABLE 1

| PSA Process Performance and Operating Conditions. | |
|---|---|
| Cycle time(s): | 480 |
| Adsorbent in first layer of Bed | Alumina |
| Amount of alumina (lb/TPD $H_2$): | $1.053 \times 10^3$ |
| Adsorbent in second layer of bed: | activated carbon |
| Amount of activated carbon (lb/TPD $H_2$): | $2.804 \times 10^3$ |
| Adsorbent in third layer of bed: | VSA6 zeolite |
| Amount of zeolite (lb/TPD $H_2$): | $2.063 \times 10^3$ |
| High Pressure: | $9.324 \times 10^2$ kPa |
| Low Pressure: | $1.360 \times 10^2$ kPa |
| Feed Flux (Kmol/s · m$^2$) | $1.5814 \times 10^{-2}$ |
| Hydrogen Purity: | 99.99% |
| Hydrogen Recovery: | 75% |
| Total Bed Size Factor (lb/TPD $H_2$) | $5.920 \times 10^3$ |
| Temperature | 311.2 K |
| TPD = ton (2000 lb) | Pa = S.I. unit for |
| atm. = 1.01325 bars = 101.32 | pressure (1.0) |

TABLE 2

Valve Firing Sequence for twelve-step three bed hydrogen PSA Process

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Step Times (seconds) | 90 | 24 | 35 | 11 | 90 | 24 | 35 | 11 | 90 | 24 | 35 | 11 |
| Bed 1 | AD1 | AD2 | AD3 | ED1 | PPG | ED2 | BD1 | BD2 | PG | EUI | PP | EU2/FD |
| Bed 2 | PG | EUI | PP | EU2/FD | AD1 | AD2 | AD3 | ED1 | PPG | ED2 | BD1 | BD2 |
| Bed 3 | PPG | ED2 | BD1 | BD2 | PG | EUI | PP | EU2/FD | AD1 | AD2 | AD3 | ED1 |
| Valve No. | | | | | | | | | | | | |
| 1 | O | O | O | C | C | C | C | C | C | C | C | O |
| 2 | C | C | C | O | O | O | O | C | C | C | C | C |
| 3 | C | C | C | C | C | C | C | O | O | O | O | C |
| 4 | C | C | C | C | C | C | O | O | O | C | C | C |
| 5 | O | C | C | C | C | C | C | C | C | C | O | O |
| 6 | C | C | O | O | O | C | C | C | C | C | C | C |
| 7a | C | C | C | C | O | O | C | C | C | C | C | O |
| 7b | C | C | C | C | C | C | C | C | C | C | O | C |
| 7c | C | C | C | O | C | C | C | C | O | O | C | C |
| 8a | O | O | C | O | C | C | C | O | O | O | C | C |
| 8b | C | C | O | C | C | C | C | C | C | C | C | C |
| 9a | O | O | C | C | O | O | C | O | C | C | C | O |
| 9b | C | C | C | C | C | C | O | C | C | C | C | C |
| 10 | O | O | O | C | C | C | C | C | C | C | C | C |
| 11 | C | C | C | C | O | O | O | C | C | C | C | C |
| 12 | C | C | C | C | C | C | C | C | O | O | O | C |
| 13 | O | C | C | O | O | C | C | O | O | C | C | O |

AD: Adsorption/Product Production
PG: Receive Purge
ED1: First Equalization Down
EU1: First Equalization Up
PPG: Provide Purge Gas
EU2: Second Equalization Up
ED2: Second Equalization Down
PP: Product Pressurization Using R Gas (RG)
BD: Blowdown
FD: Feed Pressurization Referring to FIGS. 1–3 and Table 2, the three bed twelve step PSA process is now described over one complete PSA cycle.

Step No. 1: Feed gas is introduced to the bottom of Bed 1 while hydrogen product is taken from the top (AD1). Bed 2 is receiving purge gas from Bed 3. At start of step 1, the pressure in Bed 1 is close to adsorption pressure. Valve 1 is open to allow feed into the bottom of Bed 1 and Valve 10 is open to allow product hydrogen out of the top of Bed 1. However, product production does not occur until Bed 1 reaches the adsorption pressure. At this point CV-5 opens and controls the pressure in the bed for constant pressure product production. Valves 8a and 9a are open to allow purge gas to flow from Bed 3 to Bed 2 through Control Valve CV-2. Valves 5 and 13 remain open to allow purge gas to flow out of the bottom of Bed 2.

Step No. 2: Bed 1 is in the second adsorption step (AD2). Bed 3 undergoes a second equalization down while Bed 2 receives gas from Bed 3 and undergoes a first equalization up. At the start of step 2, Valves 1 and 10 remain open to allow product production to continue from Bed 1. Valves 8a and 9a also remain open to allow equalization to occur between Beds 2 and 3. However, the equalization gas flows through Control Valve CV-3 instead of CV-2. Valves 5 and 13 close.

Step No. 3: Bed 1 is in the third adsorption step (AD3). Bed 2 receives product pressurization gas from the product manifold. Bed 3 undergoes a first counter-current blowdown. At the start of step 3, Valves 1 and 10 remain open to allow product production to continue from Bed 1. Valves 8a and 9a close. Valve 8b opens to allow product gas to pressurize Bed 2. Valve 6 opens to allow Bed 3 to undergo counter-current blowdown. Valve CV-1 controls the flow rate of the blowdown gas.

Step No. 4: Bed 1 undergoes a first equalization down (ED1) while Bed 2 receives gas from Bed 1 and undergoes a second equalization up overlapped with feed pressurization. Bed 3 undergoes a second counter-current blowdown. At the start of step 4, Valves 1, 8b and 10 close. Valves 7c and 8a open to allow equalization to occur between Beds 1 and 2 through Control Valve CV-3. Valve 2 opens to allow feed pressurization in Bed 2. Valve 13 opens and Valve CV-1 closes.

Step No. 5: Bed 1 provides purge gas to Bed 3 (PPG) while Bed 2 undergoes the first adsorption step. At the start of step 5, Valves 7c and 8a close. Valve 2 remains open to allow feed gas into the bottom of Bed 2 and Valve 11 is open to allow product hydrogen out of the top of Bed 2. However, product production does not occur until Bed 2 reaches the adsorption pressure. At this point CV-5 opens and controls the pressure in the bed for constant pressure product production. Valves 7a and 9a are open to allow purge gas to flow from Bed 1 to Bed 3 through Control Valve CV-2. Valves 6 and 13 remain open to allow purge gas to flow out of the bottom of Bed 3.

Step No. 6: Bed 1 undergoes a second equalization down (ED2) while Bed 3 receives gas from Bed 1 and undergoes a first equalization up. Bed 2 undergoes the second adsorption step. At the start of step 6, Valves 2 and 11 remain open to allow product production to continue from Bed 2. Valves 7a and 9a also remain open to allow equalization to occur between Beds 1 and 3. However, the equalization gas flows through Control Valve CV-3 instead of CV-2. Valves 6 and 13 close.

Step No. 7: Bed 1 undergoes the first counter-current blowdown (BD1). Bed 2 undergoes the third adsorption step while Bed 3 receives product pressurization gas from the product manifold. At the start of step 7, Valves 2 and 11 remain open to allow product production to continue from Bed 2. Valves 7a and 9a close. Valve 9b opens to allow product gas to pressurize Bed 3. Valve 4 opens to allow Bed 1 to undergo counter-current blowdown. Valve CV-1 controls the flow rate of the blowdown gas.

Step No. 8: Bed 1 undergoes the second counter-current blowdown (BD2). Bed 2 undergoes a first equalization down while Bed 3 receives gas from Bed 2 and undergoes a second equalization up overlapped with feed pressurization. At the start of step 8, Valves 2, 9b, and 12 close. Valves 8a and 9a open to allow equalization to occur between Beds 3 and 2 through Control Valve CV-3. Valve 3 opens to allow feed pressurization in Bed 3. Valve 4 remains open and Bed 1 continues to undergo counter-current blowdown. Valve 13 opens and Valve CV-1 closes.

Step No. 9: Bed 1 receives purge gas from Bed 2 (PG) while Bed 3 undergoes the first adsorption step. At the start of step 9, Valve 9a closes. Valve 3 remains open to allow feed gas into the bottom of Bed 3 and Valve 12 is open to allow product hydrogen out of the top of Bed 3. However, product production does not occur until Bed 3 reaches the adsorption pressure. At this point CV-5 opens and controls the pressure in the bed for constant pressure product production. Valve 7c opens and Valve 8a remains open to allow purge gas to flow from Bed 2 to Bed 1 through Control Valve CV-2. Valves 4 and 13 remain open to allow purge gas to flow out of the bottom of Bed 1.

Step No. 10: Bed 1 undergoes a first equalization up (EU1) while Bed 2 provides gas to Bed 1 and undergoes a second equalization down. Bed 3 undergoes the second adsorption step. At the start of step 10, Valves 3 and 12 remain open to allow product production to continue from Bed 3. Valves 7c and 8a also remain open to allow equalization to occur between Beds 2 and 1. However, the equalization gas flows through Control Valve CV-3 instead of CV-2. Valves 4 and 13 close.

Step No. 11: Bed 1 receives product gas from the product manifold for product pressurization. Bed 2 undergoes the first counter-current blowdown. Bed 3 undergoes the third adsorption step. At the start of step 11, Valves 3 and 12 remain open to allow product production to continue from Bed 3. Valves 7c and 8a close. Valve 7b opens to allow product gas to pressurize Bed 1. Valve 5 opens to allow Bed 2 to undergo countercurrent blowdown. Valve CV-1 controls the flow rate of the blowdown gas.

Step No. 12: Bed 1 undergoes a second equalization up with overlapped feed pressurization (EU2/FD) while Bed 3 provides gas to Bed 1 and undergoes a first equalization down. Bed 2 undergoes the second counter-current blowdown. At the start of step 12, Valves 3, 7b, and 12 close. Valves 7a and 9a open to allow equalization to occur between Beds 3 and 1 through Control Valve CV-3. Valve 1 opens to allow feed pressurization in Bed 3. Valve 5 remains open and Bed 2 continues to undergo counter-current blowdown. Valve 13 opens and Valve CV-1 closes.

Note from FIG. 2 and Table 2 that the three beds operate in parallel, and during ⅓ of the total cycle time one of the beds is in the adsorption step, while the other beds are either undergoing purging, equalization, countercurrent blowdown, and product pressurization.

Figure 4:
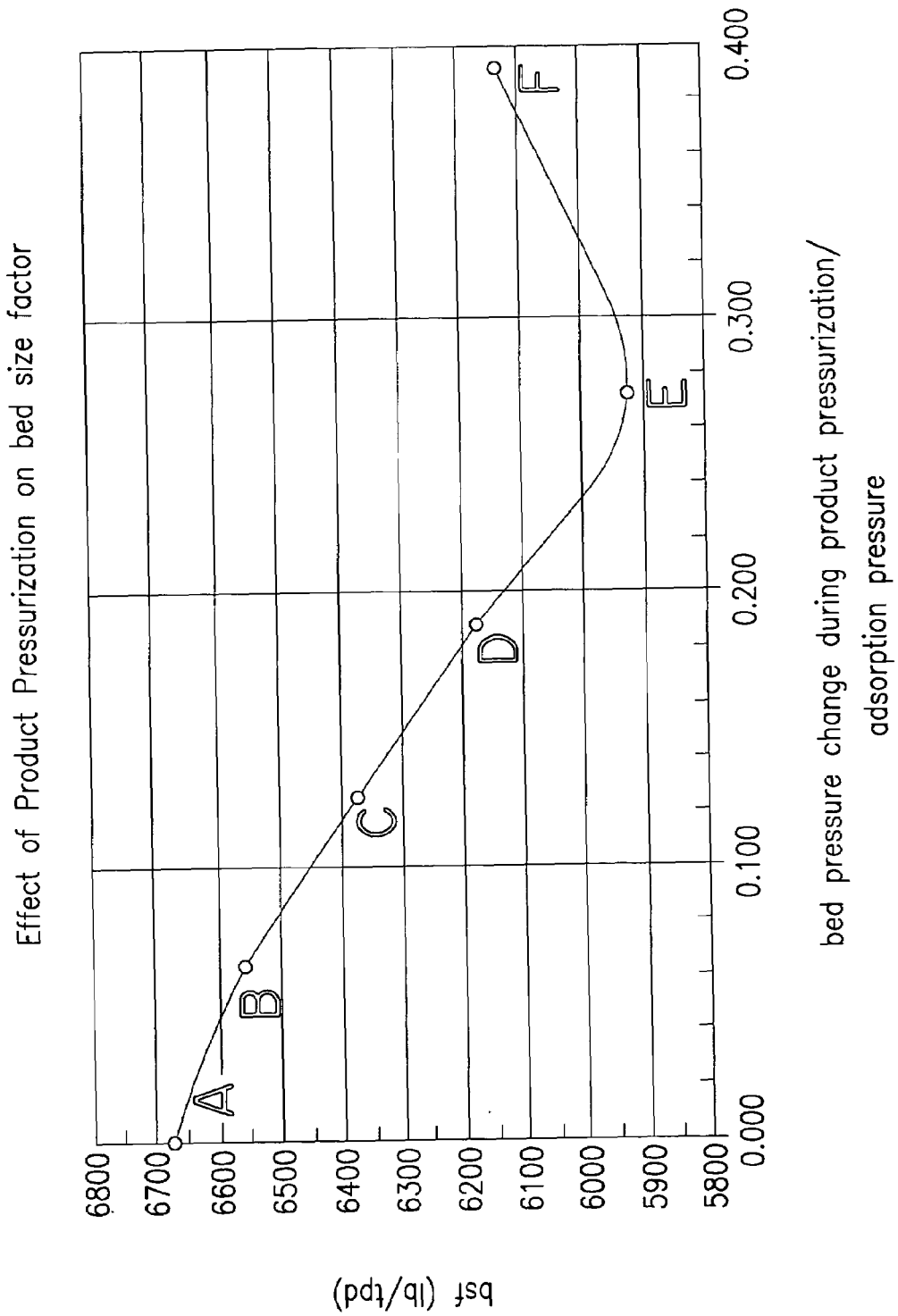
FIG. 4 is a plot of bed size factor versus bed pressure change during product pressurization/adsorption pressure for a three bed PSA system.

Based on pilot plant and PSA simulation results, there is an optimum amount of product pressurization and high pressure equalization gas required to achieve high $H_2$ recovery in the three bed PSA process of this invention. Also, since the product pressurization step (see FIG. 2) is before the high pressure equalization step (ED1), then using too much product pressurization gas will result in a much reduced quantity of gas recovered in the high pressure equalization step. Because the driving force (pressure gradient) is reduced with increasing amount of gas used for product pressurization, there is an optimum quantity of product pressurization gas and high pressure equalization gas to be used in the PSA process in order to achieve high $H_2$ recovery (low bed size factor). FIG. 4 shows a plot of the bed size factor (bsf) for various amounts of product pressurization gas used in the PSA process of FIGS. 1 and 2.

Referring to FIG. 4, Points B-E show data for the twelve step PSA process shown in FIGS. 1 and 2 when the amount of product pressurization gas used in the PSA process is varied. Point E shows the optimum amount of product pressurization to achieve the minimum bed size factor (bsf). In FIG. 4, the amount of product pressurization is defined by dividing the change in bed pressure during the product pressurization step by the adsorption pressure.

Some novel features of the 12-step three bed PSA system are the use of two pressure equalization steps in addition to purging and product pressurization steps, use of the product pressurization step before the pressure equalization step, use of continuous supply feed gas and a constant pressure product gas step.

Figure 5:
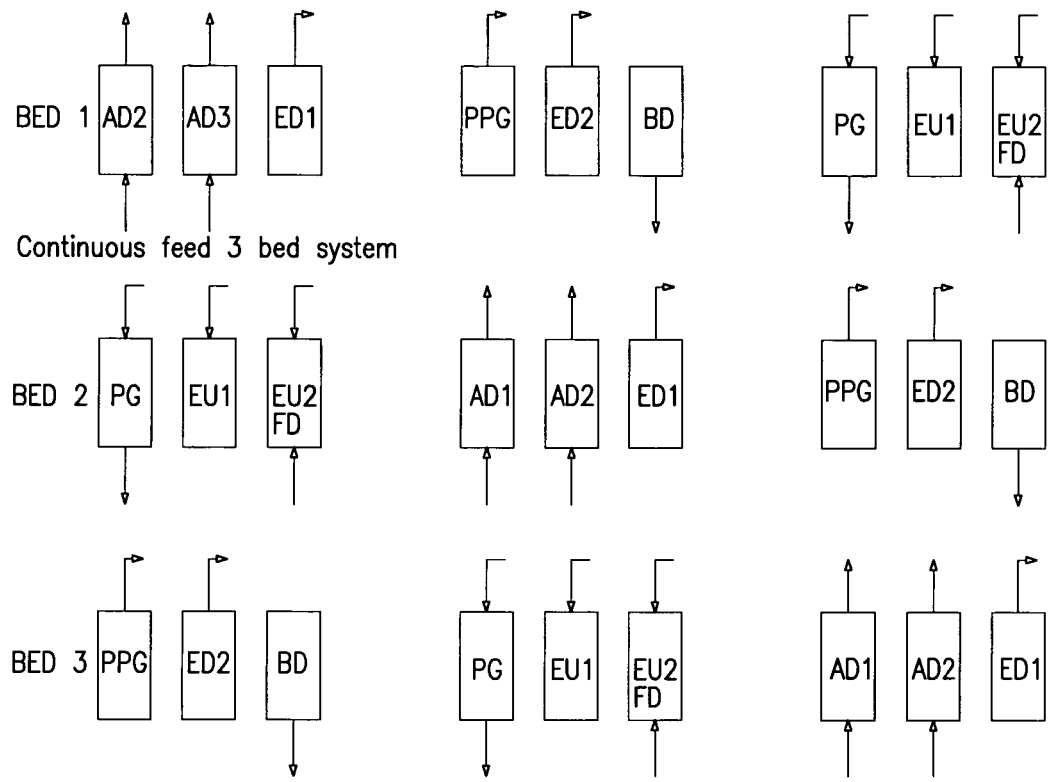
FIG. 5 is a series of schematic illustrations of adsorption beds as they undergo each step of the second embodiment of a nine-step three bed PSA system of the present invention.
Figure 6:
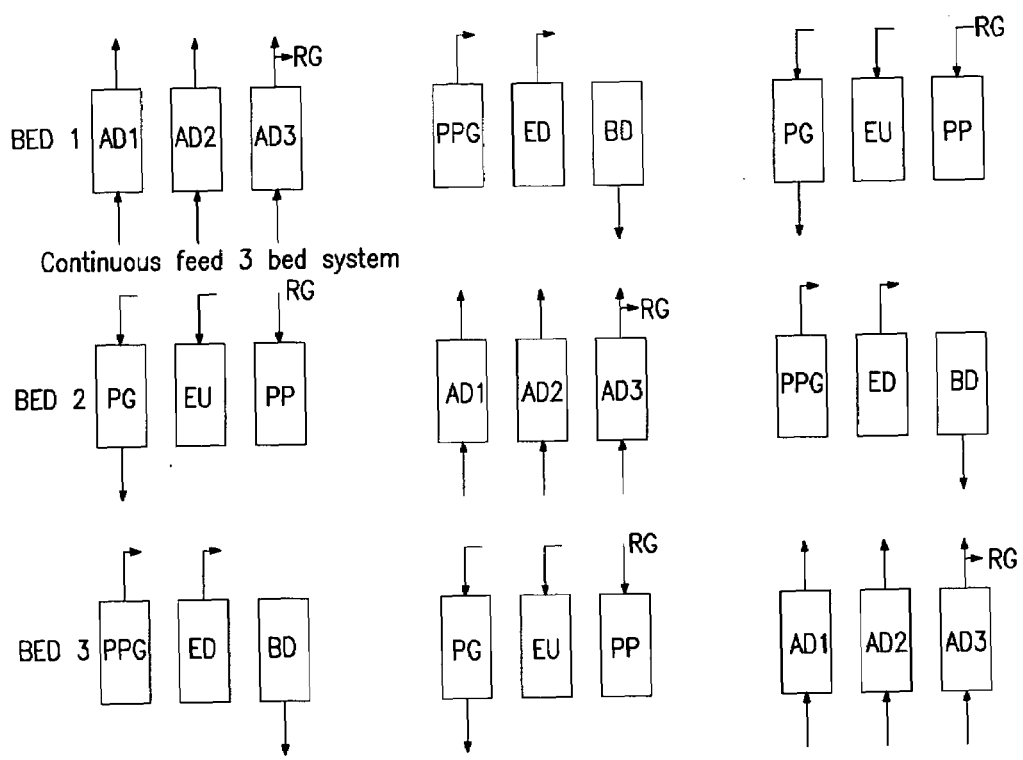
FIG. 6 is a series of schematic illustrations of adsorption beds as they undergo each step of the third embodiment of a nine-step three bed PSA system of the present invention.

In the limiting cases where no product pressurization or high pressure equalization is used, the PSA process of FIG. 2 is reduced to two different 9-step processes. For example, if steps 3, 7 and 11 are eliminated (i.e., no product pressurization case) from the twelve step PSA cycle in FIG. 2, then the resulting PSA cycle is reduced to a 9-step cycle shown in FIG. 5. This cycle (FIG. 5) has a high pressure equalization step but has no product pressurization step. This is Point A on FIG. 4. Alternatively, if steps 4, 8 and 12 are eliminated (i.e., no high pressure equalization), then the resulting cycle is reduced to a 9-step PSA cycle shown in FIG. 6. This cycle (FIG. 6) has a product pressurization step but has no high pressure equalization step. This is Point F on FIG. 4. In accordance to the teachings of this invention, the three bed PSA process depicted in FIGS. 1 and 2 has enhanced $H_2$ recovery (lower bed size factor) when the ratio of product pressurization to adsorption pressure ranges from 0.20 to 0.35. In addition, this optimum ratio of product pressurization to adsorption pressure holds for adsorption pressures from 20 psig to 900 psig for the twelve-step PSA system and 50 psig to 900 psig for the 9-step PSA system.

It will be understood that other changes may be made in the parameters of the PSA system hereof without departing from the invention. Accordingly, it is intended that the scope of this invention should be determined from the claims appended hereto.

What is claimed:

1. A pressure swing adsorption (PSA) process for separating a pressurized feed supply gas containing at least one more strongly adsorbable component and at least one less strongly adsorbable product gas component in a three bed system which comprises continuous feeding of a supply gas into a feed input end of an adsorber bed containing at least one solid adsorbent which preferentially adsorbs the more strongly adsorbable component and withdrawing the least strongly adsorbable product component from an exit end of the adsorber bed, producing in a twelve-step cycle in which the continuous feeding of the supply gas sequentially through each of the adsorber beds produces gas product by using continuous feed gas, constant product gas step, a product pressurization steps, a high pressure equalization step wherein two beds are equalized without evacuation or atmospheric repressurization, blowdown steps and a purge step in the PSA cycle.

2. The pressure swing adsorption process of claim 1 wherein the product pressurization step occurs before the high pressure equalization step.

3. The pressure swing adsorption process of claim 1 wherein the product gas is selected from the group consisting of hydrogen, helium, natural gas, $CO_2$ and co-produced hydrogen and CO.

4. The pressure swing adsorption process of claim 3 wherein the product gas is hydrogen.

5. The pressure swing adsorption process of claim 4 containing an adsorption pressure step and wherein product pressurization to an adsorption pressure ratio has a range from about 0.20 to about 0.35 for adsorption pressures from about 20 psig to about 900 psig.

6. The pressure swing adsorption process of claim 1 wherein each adsorption bed contains activated carbon with zeolitic material.

7. The pressure swing adsorption process of claim 4 wherein each adsorption bed contains activated carbon, zeolitic material and alumina.

8. A pressure swing adsorption process for separating a pressurized feed supply gas containing at least one more strongly adsorbable component and at least one less strongly adsorbable product gas component in a three bed system which comprises the continuous feeding of a supply gas into a feed input end of an adsorber bed containing at least one solid adsorbent which preferentially adsorbs the more strongly adsorbable component and withdrawing the least strongly product gas component from an exit end of the adsorber bed in a twelve-step cycle following the cycle chart:

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 1 | AD1 | AD2 | AD3 | ED1 | PPG | ED2 | BD1 | BD2 | PG | EUI | PP | EU2/FD |
| Bed 2 | PG | EUI | PP | EU2/FD | AD1 | AD2 | AD3 | ED1 | PPG | ED2 | BD1 | BD2 |
| Bed 3 | PPG | ED2 | BD1 | BD2 | PG | EUI | PP | EU2/FD | AD1 | AD2 | AD3 | ED1 | wherein
AD: Adsorption/Product Production,
ED1: First Equalization Down,
PPG: Provide Purge Gas,
ED2: Second Equalization Down,
BD: Blowdown,
PG: Receive Purge,
EU1: First Equalization Up,
EU2: Second Equalization Up,
PP: Product Pressurization Using R Gas (RG), and
FD: Feed Pressurization.

9. The pressure swing adsorption process of claim 8 wherein the product is hydrogen and step 1 is about 90 seconds, step 2 is about 24 seconds, step 3 is about 35 seconds, step 4 is about 11 seconds, step 5 is about 90 seconds, step 6 is about 24 seconds, step 7 is about 35 seconds, step 8 is about 11 seconds, step 9 is about 90 seconds, step 10 is about 24 seconds, step 11 is about 35 seconds and step 12 is about 11 seconds.

10. The pressure swing adsorption process of claim 8 wherein each adsorption bed contains activated carbon, zeolitic material and alumina.

11. The pressure swing adsorption process of claim 8 wherein the product pressurization to an adsorption pressure ratio has a range from about 0.20 to about 0.35 for adsorption pressures from about 20 psig to about 900 psig.

* * * * *